US005647045A

United States Patent [19]
Robinson et al.

[11] Patent Number: 5,647,045
[45] Date of Patent: Jul. 8, 1997

[54] MULTI-MEDIA CONNECTION HOUSING

[75] Inventors: Scott T. Robinson, Redmond; Peter H. Newman, Marysville; Jack K. Merrow; DeWayne J. Anderson, both of Kirkland, all of Wash.

[73] Assignee: Leviton Manufacturing Co., Inc., Littleneck, N.Y.

[21] Appl. No.: 606,521

[22] Filed: Feb. 23, 1996

[51] Int. Cl.$^6$ .................................................. G02B 6/10
[52] U.S. Cl. .................................................. 385/135
[58] Field of Search ................................ 385/135, 136, 385/99, 76, 140, 147; 250/227.16

[56] References Cited

U.S. PATENT DOCUMENTS

| | | | |
|---|---|---|---|
| 1,930,610 | 10/1933 | Despard | 40/10 |
| 4,655,529 | 4/1987 | Yokoyama | 339/122 R |
| 4,725,124 | 2/1988 | Blackwood et al. | 439/535 |
| 4,756,695 | 7/1988 | Lane et al. | 439/76 |
| 4,875,880 | 10/1989 | Welch et al. | 439/536 |
| 4,894,024 | 1/1990 | Debortoli et al. | 439/535 |
| 4,979,793 | 12/1990 | Bowen et al. | 385/147 |
| 5,007,860 | 4/1991 | Robinson et al. | 439/540 |
| 5,037,175 | 8/1991 | Weber | 385/76 |
| 5,185,844 | 2/1993 | Bensel, III et al. | 385/135 |
| 5,363,467 | 11/1994 | Keith | 385/135 |
| 5,402,515 | 3/1995 | Vidacovich et al. | 385/135 |
| 5,446,822 | 8/1995 | Keith | 385/135 |
| 5,503,369 | 4/1996 | Frost et al. | 254/134.3 FT |

OTHER PUBLICATIONS

AMP Surface Mount Outlet IS 3281 Instruction Sheet, released Mar. 9, 1992, AMP Incorporated, Harrisburg, PA 17105.

UTS–SSO (SIECOR) Silhouette Outlet) Installation Siecor Recommended Procedure SRP–003–296, Issue 1, May 1992, Siecor Corporation, Hickory, NC 28603–0489.

*Primary Examiner*—Akm E. Ullah
*Attorney, Agent, or Firm*—Seed and Berry LLP

[57] ABSTRACT

A housing of the type for receiving telecommunication cables and multi-media connection members, wherein the housing includes a base plate with a side edge portion for supporting a plurality of multi-media connection members, a first optical fiber storage ring that is attached to the base, and a second optical fiber storage ring that is attached to the base substantially side-by-side with the first optic storage guide. The first and second optic storage guides each have a substantially cylindrical outer guide surface with a radius that is equal to or greater than the minimum bend radius of the optical fibers. The first and second optical fiber storage rings are spaced apart from each other to define a cross-over junction therebetween that is adapted to receive the optical fibers extending between the first and second fiber storage rings. An outer guidewall is selectively spaced about the first and second optical fiber storage guides to retain the optical fibers wrapped about the storage rings. The outer guidewalls have openings to receive the optical fibers into an optical fiber path about the first and second storage rings such that the optical fibers extend substantially tangentially toward the first or second optical fiber storage ring. A connection support platform is positioned in the first optical fiber storage ring, and is adapted to removably receive an electrical connector in a substantially fixed position relative to the base to facilitate a wire installation procedure.

26 Claims, 3 Drawing Sheets

MULTI-MEDIA CONNECTION HOUSING

DESCRIPTION

1. Technical Field

The present invention is directed toward a telecommunication housing, and more particularly, toward a multi-media connection housing for integration of telecommunication cables and connection members.

2. Background of the Invention

The development of telecommunications and the information superhighway has resulted in the need for multiple telecommunication interconnections in offices and homes. In the past, a standard office usually required only a single communication wall connector, such as a telephone jack, between a worker and the outside world. The increased use of audiovisual, computer, facsimile machines, and cable equipment for communication has significantly increased the requirement for telecommunication cable connections. A single worker may have equipment that requires multiple telecommunication cable connections, such as a computer network coupling, a modem coupling, a telephone coupling, fiber optic cable coupling, and a coaxial cable connection.

Telecommunication cables, including electric wiring, optical fibers, and coaxial cables, are typically routed through an office or house in surface mounted conduits, or within the walls, floors, and ceilings. Each of the cables terminates at a connection member, such as, but not limited to, an optical fiber adapter, a phone jack, or an electrical connector. The respective connection member is adapted to be operatively coupled to a connection member of selected telecommunications equipment within the office or house.

The connection members are typically retained in a flush mounted or surface mounted assembly. Conventional flush mounted multi-media connection boxes, such as is disclosed in U.S. Pat. No. 5,007,860, provide a communication coupling system for supporting connection members in a single conventional wall mounted electric box. The coupling system is effective when supporting a limited number of telecommunication cables that require 2–4 connectors or adapters and that are routed through a wall, partition, or the like to the electric box. The flush mounted coupling system is also effective in environments that require a limited degree of flexibility in reconfiguring the connectors and adapters to accommodate different telecommunications cabling arrangements. Accordingly, the flush mounted communication coupling system experiences some limitations in its capacity and flexibility.

Other conventional multi-media connection boxes receive a plurality of telecommunication cables therein, and selected lengths of each cable are stored in the boxes. When one or more of the telecommunication cables is a fiber optic cable, the industry standard requires at least one meter of the optical fiber cable be stored in the connection box. The optical fibers in the fiber optic cable are wound in a single coil within the box, and the free end of each optical fiber is connected to an adapter attached to the box. If the conventional optical fibers are coiled or otherwise bent within the housing with a radius that is less than 1.18 inches, the signal transmitted on the optical fiber will experience excessive attenuation loss, resulting in degradation of the optical signal through the cabling system. Accordingly, the optical fibers must be wound in the coil, stored within the connection box, and connected to the selected adapter without achieving a bend radius less than 1.18 inches.

The size of conventional surface mounted connection boxes have been reduced to require a small mounting surface on the wall or partition. Thus, smaller connection boxes have experienced difficulty in storing the optical fibers and providing a connection to the selected adapters without bending the optical fibers in excess of the 1.18 inch minimum bend radius. A further drawback of the conventional connection boxes is that the optical fibers are stored together in a limited space in the box with the other telecommunication cables, such as a copper wire cable or a coaxial cable. The optical fibers and other cables often interfere with each other, particularly during installation or reconfiguration of the connection box and the connection members.

A conventional multi-media connection box is installed in an office or house during a procedure wherein the telecommunication cables are extended into the box, and the cable is attached to the selected connection member. The conventional connection boxes typically are not adapted to assist in the connection procedures. As an example, a copper wire cable is attached to an industry standard type insulation displacement connection (IDC) connector, such as a Leviton 110 termination jack, and the IDC connector is removably attached to the connection box in a selected location. The IDC connector is relatively small, and an installer typically holds the IDC connector in one hand while trying to manipulate the copper wires from the cable onto the IDC contacts of the connector. The installer then uses a 110 punch down tool to fix the connection between the IDC connector and the copper wire cable. Accordingly, the connection procedure is completed in the hands of the installer. The 110 punch down tool requires a significant amount of force to make the proper connection between the copper wires and the IDC connector in the field, such that the connection process can be a labor-intensive, tedious, and time-consuming process. The attached IDC connector is then positioned in the connection box.

SUMMARY OF THE INVENTION

The present invention is directed toward a housing of the type for receiving telecommunication cables and multi-media connection members that overcomes the problems experienced by the conventional connection boxes. In a preferred embodiment of the present invention, a housing is adapted to receive optical fibers therein that are operatively connected to adapters such that the optical fibers do not bend with a radius that is less than a minimum bend radius. The housing includes a base with a side edge portion for supporting a plurality of multi-media connection members, a first optical fiber storage guide that is attached to the base, and a second optical fiber storage guide that is attached to the base substantially side-by-side with the first optical fiber storage guide. The first and second optic storage guides each have a substantially cylindrical outer guide surface with a radius that is equal to or greater than the minimum bend radius of the optical fibers.

The first and second optical fiber storage guides are spaced apart from each other, and a cross-over junction is provided between the optical fiber storage guides. The first and second optical fiber storage guides are sized and positioned to allow the optical fibers to wrap about the first and second outer guide surfaces, pass through the cross-over junction, and extend between the first and second optical fiber storage guides in a selected distribution pattern without bending in a radius that is smaller than the minimum bend radius and with the respective optical fiber terminating adjacent to the side edge portion of the base.

Outer guide walls are selectively spaced about the first and second optical fiber storage guides and spaced away from the cross-over junction to retain the optical fibers in the selected distribution pattern around the first and second optical fiber storage guides. The outer guide walls have openings to receive the optical fibers as the optical fibers extend through a breakout raceway in a side of the cover and into the housing. The openings in the outer guide wall are positioned so the optical fibers are routable to extend substantially tangentially toward a selected one of the first or second optical fiber storage guides for continued routing of the optical fiber about the first and second storage rings. The outer guides include curved portions on opposite sides of the cross-over junction that extend toward each other, and each of the curved portions has a radius of curvature that is equal to or greater than the minimum bend radius of the optical fibers.

In one embodiment of the invention, the housing includes a connector support platform within the first optical fiber storage guide and attached to the base. The connector support platform is shaped to removably support a selected one of the connection members in a generally fixed position relative to the base and the first optical fiber storage guide. The connector support platform has an upper platform portion that is supported above the base by sidewalls, so the upper platform portion is above the base and positioned generally adjacent to a top edge portion of the first optical fiber storage guide. The upper platform portion removably receives the selected connector thereon to facilitate connection of telecommunication cable to the connector.

In one embodiment of the present invention, the base includes a cover alignment guide projecting away from the base. A latch tab projects from the cover alignment guide at one end of the base, and a cover retaining tab projects from the cover alignment guide at the opposite end of the base. The housing further includes a cover releasably attached to the latch tab and the cover retaining tab to enclose the base and the first and second optical fiber guides. The cover includes a top panel and outer sidewalls that extend between the top panel and the base when the cover is in a covering position over the base. The outer sidewall of the cover has a tab receiving aperture extending therethrough that removably receives the latch tab when the cover is in the covering position, and a tab recess extending only partially through the outer wall portion such that the retaining tab and the tab recess are not visible from the exterior of the housing when the cover is in the covering position.

The outer sidewall extends partially around the top panel and terminates at first and second end portions with a space therebetween that is adapted to receive one or more connecting members. The first end portion defines a free end of the outer sidewall that is deflectable and movable relative to the base, such that the outer sidewall portion having the latch aperture therein is movable relative to the latching tab between a latched position and a released position. In the latched position the latching tab extends into the latch aperture to retain the cover on the base, and in the released position the latch tab is out of the latch aperture to allow the cover to be moved away from the base to expose the first and second optical fiber alignment guides. When the cover is in the covering position, the latching tab and latch aperture are visible from the exterior of the housing and the retaining tab is hidden, so as to provide a visual indication to the user which end of the cover to manipulate to remove the cover from the base.

In another embodiment of the invention, a splice pad platform is attached to the first and second optical fiber storage guides and extends over the cross-over junction. The splice pad platform has an inverted, generally U-shaped support clip with first and second legs that engage the first and second optical fiber storage guides, and a web portion extends between the first and second legs and over the cross-over junction. A splice tray is attached to the web portion, and the splice tray has a plurality of fiber retention grooves therein shaped to receive end portions of optical fibers to retain the optical fibers in an end-to-end configuration during a fiber splicing operation.

DETAILED DESCRIPTION OF THE INVENTION

A multi-media connection housing 10 in accordance with the present invention is shown in the figures for illustrative purposes. The illustrated housing 10 is a surface mounted housing that is adapted to mount to a wall, partition, or other surface, in a work station of an office or home. The housing 10 receives a fiber optic cable 12 and a pair of wire cables 14. The fiber optic cable 12 and the wire cable 14 are shown in a configuration wherein the cables are routed through the wall or partition of the office or home. The housing 10 is also adapted to receive telecommunication cables that are routed to the housing in surface mounted conduits in the office or home. The housing 10 retains selected portions of the fiber optic and wire cables 12 and 14. The illustrated fiber optic cable 12 has four optical fibers 16, each being attached via an optical fiber connector to an adapter 18, such as ST, SC, or FC adapters. Each of the wire cables 14 is attached to an electric connector 20, such as a telephone jack, an F connector, or a BNC connector. The optic adapters 18 and electrical connector 20 are removably mounted in the housing 10 and are releasably connectable to selected telecommunication devices, such as a computer, a facsimile machine, or audio-visual equipment within the office or house. Although the housing 10 of the illustrated embodiment is shown with optical fiber and wire cables, and the respective adapters and connectors, the housing is adapted to receive other telecommunication cables and the respective connection member.

Figure 1:
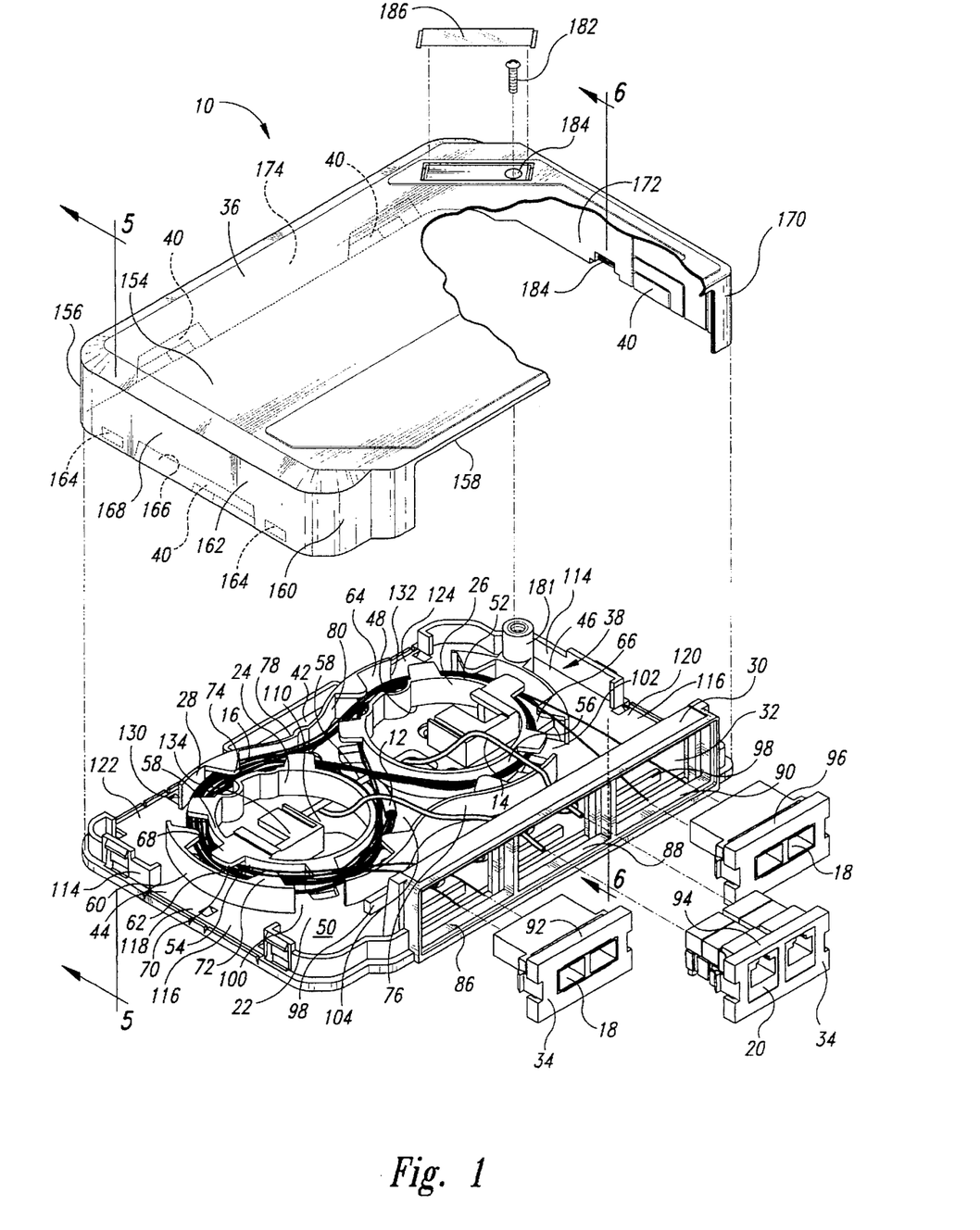
FIG. 1 is a fragmentary, partially exploded top isometric view of a multi-media connection housing in accordance with the present invention, with telecommunication cables and connection members shown coupled to the housing.

As best seen in FIG. 1, the housing 10 includes a base plate 22 that is mountable to a wall surface or the like adjacent to a portion from which the fiber optic cable 12 and wire cables 14 extend. A left optical fiber storage ring 24 and a right optical fiber storage ring 26 are attached to the base plate 22 and spaced apart from each other. The left and right storage rings 24 and 26 are positioned to receive at least one meter of the optical fibers 16 in the fiber optic cable 11 so the optical fibers extend into the housing 10 and wrap about one or both of the left and right storage rings in a selected disbursement pattern. The left and right storage rings 22 and 24 are arranged on the base to allow the optical fibers 16 wrapped therearound to extend away from the respective left or right storage ring substantially tangentially to the storage ring and attach to the optical fiber adapters 18 without excessive bending of the optical fibers within the housing.

An elongated outer guide 28 is attached to the base plate 22 outward of the left and right storage rings 24 and 26 to prevent the optical fibers 16 from unwrapping from the left and right storage rings. A module mounting frame 30 is attached to a front edge portion 32 of the base plate 22 forward of the outer guide 28. The module mounting frame 30 removably receives reconfigurable connection modules 34 that selectively receive the optical fiber adapters 18, the electrical connectors 20, or other telecommunication connection members. The housing 10 receives and stores a shorter portion of the wire cable 14 therein, such that the wire cable extends into the housing and directly to the electrical connector 20 in one of the connection modules 34.

The housing 10 includes a cover 36 that is removably connected to the base plate 22 to define a substantially enclosed interior area 38 of the housing, with the left and right storage rings 24 and 26 being contained therein. The cover 36 covers and protects the optical fibers 16, the optical fiber adapters 18, the wire cables 14, the electrical connectors 20 and any other telecommunication cables and connection members contained within the housing 10. The housing 10 receives the optical fibers 16 and the wire cables 14 into the interior area 38 through the base plate 22, as an example, when the telecommunication cables are routed through the walls or partitions and to exit the partition adjacent to the back side of the housing. When the optical fibers 16, the wire cable 14 and other telecommunication cables extend to the housing 10 in a surface mounted conduit or the like in the office or home, the cables enter the interior area 38 of the housing 10 through breakout raceway openings 40 in a selected side of the cover 36.

Figure 2:
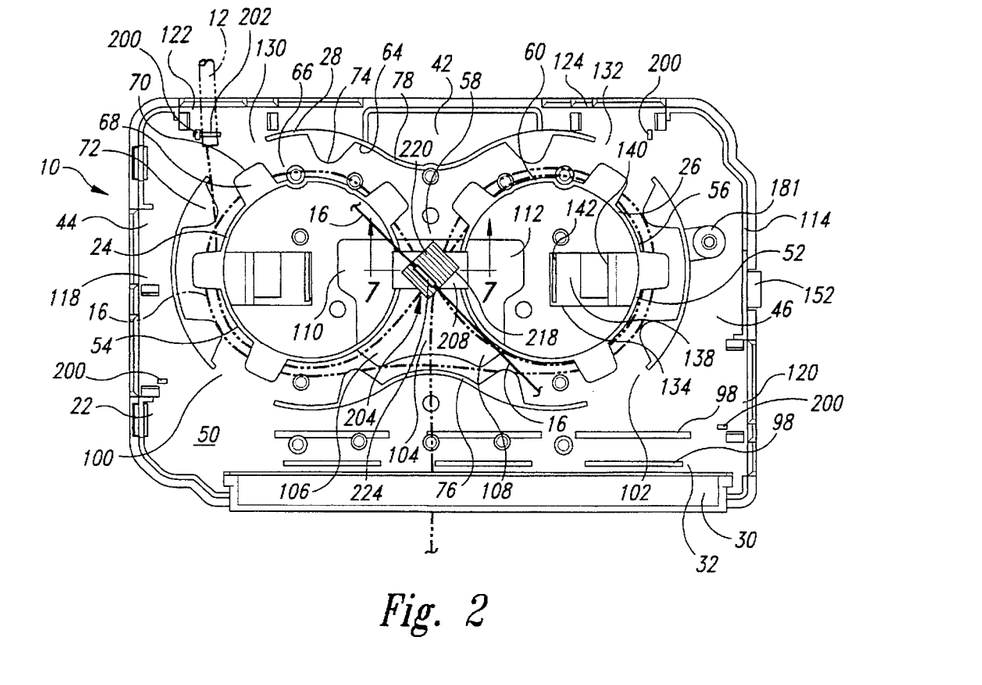
FIG. 2 is a top plan view of a base of the housing of FIG. 1, with the cover not shown, with a fiber optic line being shown in phantom lines wrapped around optical fiber storage rings, and a splice tray platform shown extending between the storage rings.

As best seen in FIGS. 1 and 2, the base plate 22 of the illustrated embodiment is a generally rectangular, planar member having a perimeter defined by the front edge portion 32, a rear edge portion 42 opposite the front edge portion, a left edge portion 44 and a right edge portion 46 extending between the front and rear edge portions. The left and right storage rings 24 and 26 are side-by-side on the base plate 22 with the left storage ring being closer to the left edge portion 46 and the right storage ring being closer to the right edge portion 46.

Each of the left and right storage rings 24 and 26 are continuous, substantially cylindrical members having a bottom edge 48 (FIG. 1) connected to an upper surface 50 of the base plate 22. The left and right storage rings 24 and 26 each project upwardly from the bottom edge 48, away from the upper surface 50, and terminate at an upper edge 52 spaced away from the upper surface. The left storage ring 24 has a substantially cylindrical left outer guide surface 54 shaped and sized to engage the optical fibers 16 wrapped about the left storage ring and to prevent the optical fibers from being coiled thereabout with a bend radius that is less than a minimum bend radius of 1.18 inches. The right storage ring 26 has a substantially cylindrical right outer guide surface 56 shaped and sized to engage the optical fibers 16 wrapped thereabout to prevent the optical fibers from being wrapped with a bend radius that is less than the 1.18 inch minimum bend radius. If an optical fiber 16 is bent or coiled with a bend radius that is less than the 1.18 inch minimum bend radius, the optic signal traveling through the optical fiber will experience excessive signal attenuation losses that will likely exceed a predetermined attenuation loss budget for the particular fiber optic cabling system. Accordingly, the left and right storage rings 24 and 26 each have a radius that is equal to or greater than 1.18 inches.

The left and right storage rings 24 and 26 are spaced apart from each other to define a cross-over junction 58 therebetween that receives the optical fibers 16 as the optical fibers extend between the left and right storage rings. The arrangement of the left and right storage rings 24 and 26 and the cross-over junction 58 allow the optical fibers 16 to be wrapped in a host of routing patterns to ensure an end portion of a selected optical fiber is distributed substantially tangentially away from a selected one of the left or right storage rings, over the outer guide 28, and to the optical fiber adapter 18 without bending past the minimum bend radius. As an example, the optical fibers 16 enter the housing 10 and a pair of the optical fibers are wrapped in a figure-8 configuration around the left and right storage rings 24 and 26, wherein the optical fibers extend about the left outer guide surface 60 in a first direction, such as a clockwise direction as viewed in FIG. 1, for a plurality of turns, and the optical fibers extend through the cross-over junction 58 and around the right outer guide surface 56 in an opposite direction, such as counterclockwise as viewed in FIG. 1. Alternatively, each optical fiber 16 may be wrapped about one of the left or right storage rings 24 or 26 in a single coil, or about both of the left and right storage rings in an elliptical pattern without passing through the cross-over junction 58 to achieve a desired distribution pattern of the optical fibers 16 from the storage rings to the selected optical fiber adapter 18 in the module mounting frame 30.

Each of the left and right storage rings 24 and 26 of the illustrated embodiment are sized to receive at least one meter of up to six optical fibers 16 from the fiber optic cable 12. The one meter of the fiber optic cable 12 allows a portion of the selected optical fiber 16 to be extended out of the housing 10 to allow a user to work with the free end of the optical fiber away from the housing, such as on a floor or a work surface, when performing the relatively delicate operation of attaching the optical fiber to the optical fiber connector. Additional telecommunication cabling can be stored in the housing for use if the configuration of the multi-media ports is subsequently changed after an initial configuration of the housing 10.

As best seen in FIG. 1, the outer guide 28 is attached at a bottom edge 60 to the upper surface 50 of the base plate 22, and terminates at an upper edge 62 that is generally coplanar with the upper edge 52 of the left and right storage rings 24 and 26. The outer guide 28 is spaced about the left and right storage rings 24 and 26 and adjacent to the cross-over junction 58. The outer guide 28 is a substantially continuous wall member having an inner guidewall surface 64 that faces inwardly and extends around the left and right fiber rings 24 and 26. The inner guidewall surface 64 is spaced apart from the left and right storage rings 24 and 26 and apart from the cross-over junction 58 to define an optical fiber path 66 therebetween that is sized to receive the optical fibers 16 as they wrap about the left and right storage rings and through the cross-over junction in the selected distribution pattern.

The optical fibers 16 are axially rigid fibers that are biased away from a coiled or bent configuration, such that an unrestrained, coiled optical fiber will generally uncoil toward a very large radius curvature, the size of which depends upon the particular fiber's characteristics. Accordingly, the optical fibers 16 seek to unwind when they are in the optical fiber path 66 and wrapped about the left and right storage rings 24 and 26. The inner guidewall surface 64 engages the optical fibers 16 in the optical fiber path 66 and prevents them from unwinding within the housing 10.

Each of the left and right storage rings 24 and 26 have a plurality of inner retaining tabs 68 that are attached at one end to the upper edge 52 of the respective storage ring, and the inner retaining tabs project radially outwardly over a portion of the optical fiber path 66. The inner retaining tabs 68 are sized to extend over the optical fibers 16 when wrapped about the left and right storage rings 24 and 26 to prevent the optical fibers from moving away from the base plate 22 and out of the optical fiber path 66. In the illustrated embodiment, the inner retaining tabs 68 extend toward the outer guide 28 and terminate at a free end 70 that is spaced apart from the outer guide to allow the optical fibers 16 to be moved toward the base plate 22 and into the optical fiber path 66 when the optical fibers are being wrapped about the left and right storage rings 24 and 26.

Outer retaining tabs 72 are connected to the outer guide 28 at the upper edge 62 and project over a portion of the optical fiber path 66. The outer retaining tabs 72 are spaced between adjacent inner retaining tabs 68 and terminate at a free end 74. The free end 74 is spaced apart from the upper edge 52 of the closest left or right storage ring 24 and 26 to provide an area through which the optical fibers 16 are passed when being wrapped about the left and right storage rings.

As best seen in FIGS. 1 and 2, the outer guide 28 has a forward curved section 76 positioned between the forward edge portion 32 of the base plate 22 and the left and right storage rings 24 and 26, and the forward curved section extends between the left and right storage rings and adjacent to the cross-over junction 58. The outer guide 28 also has a rear curved section 78 opposite the forward curved section 76 and between the rear edge portion 42 of the base plate 22 and the left and right storage rings 24 and 26. The forward and rear curved sections 76 and 78 extend inwardly toward the cross-over junction 58 and toward each other so as to define a curved path transition portion 80 of the outer guide 28 between the left and right storage rings 24 and 26. In the illustrated embodiment the optical fiber path 66 has a generally consistent width around approximately 70% of each of the fiber storage rings 24 and 26 before the optical fiber path extends into the cross-over junction 58 adjacent to the curved path transition portion 80. This configuration of the optical fiber path 66 retains the optical fibers 16 with a generally consistent bend radius to provide a smooth transition through the cross-over junction 58. The curved path transition portion 80 also has a curvature with one or more radii that are greater than the 1.18 inch minimum bend radius to avoid excessive bending of the optical fibers 16 extending along the curved path transition portion.

Figure 3:
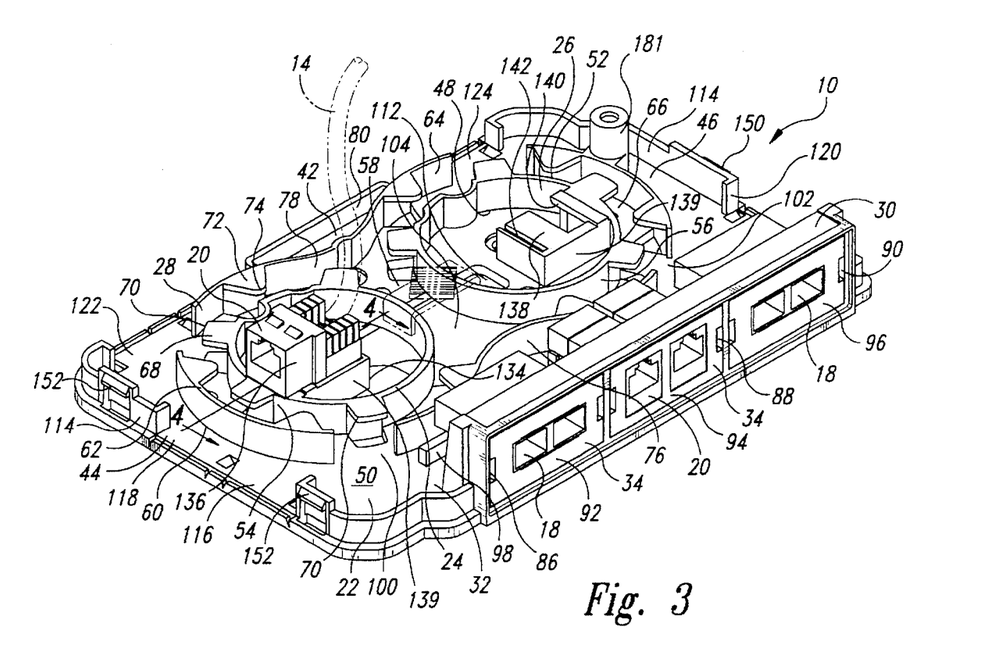
FIG. 3 is a top isometric view of the base of FIG. 2 with an electrical connector shown on a connector support platform with the splice tray platform shown in phantom lines.

As best seen in FIGS. 1 and 3, the module mounting frame 30 is integrally attached to the front edge portion 32 of the base plate 22 and extends upwardly away from the base plate. The module mounting frame 30 has three side-by-side module apertures; a left module aperture 86, a center module aperture 88, and a right module aperture 90 that each removably receives a respective one of the connection modules 34.

In the illustrated embodiment, a left module 92 having a pair of side-by-side optical fiber adapters 18 therein is positioned in the left module aperture 86, and the optic apertures extend inwardly into the interior area 38 toward the left storage ring 24. A center module 94 having a pair of electrical connectors 20, such as phone jacks, is positioned in the center module aperture 88, and the electrical connectors extend inwardly toward the cross-over junction 58. A right module 96 having a pair of optic adapters 18 therein is positioned in the right module aperture 90, and the optic adapters extend inwardly toward the right storage ring 26. Accordingly, the illustrated housing 10 having, as an example, six multi-media ports, four optical fiber adapters 18 each connected to a respective optical fiber 16, and two electrical connectors 20 connected to wire cables 14. The left, center, and right modules 92, 94, and 96, respectively, are positioned in the module mounting frame 30 to connect to the respective optical fiber 16 or wire cable 14 at a height above the base plate 22, such that the optical fibers extend from the optical fiber path 66 and over the outer guide 28 without touching or only lightly touching the upper edge 62 of the outer guide's forward curved section 76.

In alternate embodiments, the housing 10 is adapted to receive from four to twelve multi-media ports. The housing 10 is easily reconfigurable for different combinations of multi-media ports and telecommunication cables by replacing or reorganizing the connection modules 34 and the connection members therein and attaching the connection members to the respective telecommunication cable.

Each of the optical fiber adapters 18 and the electrical connectors 20 are supported partially within interior area 38 of the housing 10 rearward of the mounting frame 30 by a pair of support rails 98 that project upwardly from the base plate 22.

In another alternate embodiment, not illustrated, the center module 94 has an optical fiber adapter 18 therein, and the rearward end of the optical fiber adapter, which receives a selected optical fiber 19, is positioned at a height relative to the base plate 22 that is higher than the upper edge 62 of the outer guide's forward curved section 76. The optical fiber 16 wrapped about one or both of the left and right storage rings 24 and 26 extends substantially tangentially away from either the left or right storage rings at the cross-over junction 58, over the upper edge 62 of the outer guide's forward curved section 74 and is attached to the selected optical fiber adapter 18 without the optical fiber bending in a radius that is less than the 1.18 inch minimum bend radius. The height of the optical fiber adapter 18 is such that the optical fiber 16 does not touch the upper edge 62 of the outer guide's forward curved section 74 or only lightly rests on the upper edge.

In an alternate embodiment not shown, an access opening is provided in the forward curved section 76 of the outer guide 28 to provide direct access to the optical fiber adapter 18 in the center module 94 in the mounting frame 30 so the selected optical fiber 16 extends therethrough rather than going over the upper edge 62 of the outer guide.

In the illustrated embodiment, the outer guide 28 is a substantially continuous structure with the right and left path openings therein to provide access into and out of the optical fiber path 66. In an alternate embodiment, not shown, the outer guide 28 comprises a plurality of side-by-side projections with spaces therebetween, providing a picket fencetype configuration about the left and right storage rings 24 and 26. In another alternate embodiment not shown, the outer guide 28 comprises a plurality of pin members projecting away from the base plate 22 and selectively spaced about the left and right storage rings 24 and 26 so as to provide sufficient retention of the optical fibers 16 about the left and right storage rings.

As best seen in FIGS. 1 and 2, the base plate 22 has a cable access aperture 104 between the left and right storage rings 24 and 26, and the fiber access aperture communicates with the cross-over junction 58. The cable access aperture 104 is sized to receive the optical fibers 16 therethrough, for example, when the base plate 22 is mounted to a wall surface or the like over a conventional electric box within the wall that receives telecommunication cables routed through the wall. The cable access aperture 104 receives the optical fibers 16 therethrough directly into the cross-over junction 58, and the optical fibers are then selectively wrapped about one or both of the left and right storage rings 24 and 26 in a selected distribution pattern to terminate at a selected optical fiber adapter 18. The cable access aperture 104 is also sized to receive the wire cables 14, which are copper wire cables, or other telecommunication cable therethrough if the cabling configuration of the office or house does not include fiber optic cable 12.

As best seen in FIG. 2, the cable access aperture 104 has a forward left portion 106 adjacent to the left storage ring 24 and the outer guide's forward curved section 76, such that the forward left portion communicates with the optical fiber path 66 so the optical fibers 16 extend directly into the optical fiber path to provide a smooth passage into the optical fiber path without first passing through the cross-over junction 58. The cable access aperture 104 also has a forward right portion 108 adjacent to the right storage ring 26 and the outer guide's forward curved section 76, such that the forward right portion communicates directly with the optical fiber path 66 to allow the optical fibers 16 to extend through the cable access aperture and directly into the optical fiber path.

The cable access aperture 104 in the base plate 12 further includes a left rear portion 110 that extends under a portion of the left storage ring 24 and that communicates with the inner area of the left storage ring. Similarly, the cable access aperture 104 has a right rear portion 112 that extends under a portion of the right storage ring 26 and that communicates with the inner area of the right storage ring. Each of the left and right rear portions 110 and 112 of the access aperture 104 are sized to receive the copper wire cable 14 or other telecommunication cable therethrough so as to extend through the inner area of the respective left and right storage rings 24 and 26. The copper wire cable 14 extends over the upper edge 52 of the respective left or right storage ring 24 or 26, above the optical fiber path 66, over the upper edge 62 of the outer guide's forward curved section 76, and connects to the electrical connector 20 in the center module 94.

Accordingly, the optical fibers 16 extend through the cable access aperture 104 between the left and right storage ring 24 and 26, and the copper wire cables 14 extend through the left or right storage ring, such that the optical fibers and the copper wire cables are separated from each other to avoid entanglement or interference.

As best seen in FIGS. 1 and 3, a cover alignment guide 114 is attached to the base plate 22 substantially around its perimeter, and the cover alignment guide connects to opposite ends of the mounting frame 30. The cover alignment guide 114 has a plurality of cable access openings 116 spaced about the base plate 22. The cable access openings 116 are positioned to correspond to the raceway breakouts 40 in the cover 36. When the housing 10 is mounted to a wall or the like and the telecommunication cables are routed to the housing in one or more surface mounted conduits, a selected raceway breakout 40 is removed from the side of the cover 34, and the fiber optic cable 12 and the copper wire cables 14 or other telecommunication cable, extend through the cover, through the cable access opening 116 and into the interior area 38 of the housing 10.

As best seen in FIGS. 1 and 2, the cable access openings 116 in the outer guide 28 include a forward left path opening 100 at the left side of the forward curved section 76 that provides access to the optical fiber path 66 through the outer guide at a position generally between the left storage ring 24 and the left module aperture 86 in the mounting frame 30. The outer guide 28 also has a forward right path opening 102 at the right side of the forward curved section 76 that provides access to the optical fiber path 66 at a position generally between the right storage ring 26 and the right module aperture 90 in the mounting frame 30.

The cable access openings 116 in the cover alignment guide 114 include a left side access aperture 118 along the left edge portion 44 of the base plate 22, a right side access aperture 120 along the right edge portion 46 of the base plate, a rear, left access aperture 122 along the rear edge portion 42 adjacent to the rear left corner of the base plate, and a rear, right access aperture 124 along the rear edge portion 42 adjacent to the rear right corner of the base plate. The left side access aperture 118 is aligned with the forward left path opening 100 in the outer guide 28 so optical fibers 16 entering the housing 10 from the left side extend through the left side access aperture and into the optical fiber path 66 substantially tangentially to the left storage ring 24. Accordingly, the optical fibers 16 do not bend with a radius less than the 1.18 minimum bend radius as the optical fibers enter the optical fiber path 66. The right side access aperture 120 in the cover alignment guide 114 is aligned with the forward right path opening 102 in the outer guide 28. Optical fibers 16 entering the housing 10 from the right side extend through the right side access opening 120 and the forward right path opening 102 into the optical fiber path 66 substantially tangential to the right storage ring 26 without bending in a radius less than the 1.18 minimum bend radius.

The rear, left access aperture 122 in the cover alignment guide 114 is adjacent to a rear left fiber path opening 130 in the outer guide 28 to allow the optical fibers 16 to enter the optical fiber path 66 substantially tangentially with the left storage ring 24 without excessive bending of the optical fibers as they are selectively wrapped around the left and right storage rings 24 and 26. The rear, right access aperture 124 in the cover alignment guide 114 is adjacent to a right rear fiber path opening 132 in the outer guide 28 to allow the optical fibers 16 to enter the optical fiber path 66 substantially tangentially to the right storage ring 26 without excessive bending of the optical fibers as they are wrapped around the left and right storage rings 24 and 26.

As best seen in FIG. 2, a tie-down protrusion 200 is attached to the base plate adjacent to each of the cable access openings 116. The tie-down protrusions are adapted to removably receive a tie-down 202 that connects to a selected fiber optic cable 12, or other cable, to secure the cable in place relative to the base plate. The tie-downs 202 are typically plastic strips easily replaceable to accommodate reconfiguration of the cabling extending into the housing 10.

As best seen in FIG. 3, a connector support platform 134 is positioned within each of the left and right storage rings 24 and 26. The connector support platform 134 removably receives a conventional electrical connector, such as a Leviton 110 snap-in jack 136 or other insulation displacement connection device that connects to the copper wire cable 14 shown in phantom lines. The connector support platform 134 retains the snap-in jack 136 in a generally fixed and stable position above the base plate 22 so a user installing the copper wire cable 14 onto the snap-in jack can use both hands to position the wires on the jack and to manipulate a punch down tool, thereby ensuring a proper connection is achieved.

Figure 4:
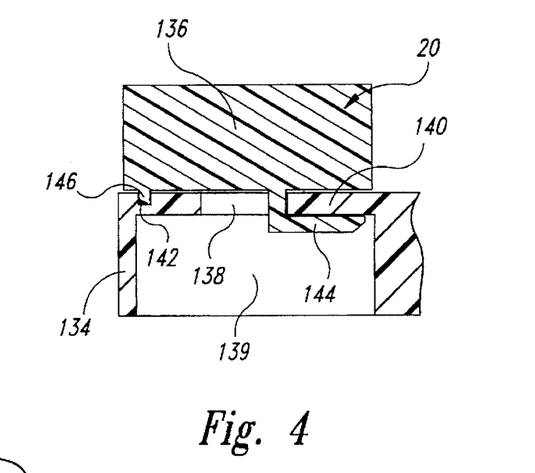
FIG. 4 is an enlarged cross-sectional view taken substantially along line 4—4 of FIG. 3 showing the electrical connector on the connector support platform.

As best seen in FIGS. 3 and 4, each connector support platform 134 has an upper platform portion 138 that is supported above the base plate 22 by sidewalls 140 that extend therebetween. The upper platform portion 138 is generally coplanar with the upper edge 52 of the left and right storage rings 24 and 26 (FIG. 3). In the preferred embodiment, one side of the upper platform portion 138 is integrally connected to the respective left or right storage rings 24 or 26 such that a portion of the respective left or right storage rings acts as a support sidewall of the connector support platform for increased strength and stability. The upper platform portion 138 has a conventional clip receiving area 140 adjacent to the storage ring's upper edge 52 and a retaining groove 142 radially inward from the clip receiving area. The clip receiving area 140 is shaped and sized to removably receive a retention clip 144 on the bottom of the snap-in jack 136, and the retaining groove 142 is sized to removably receive a support rail 146 on the bottom of the snap-in jack. The upper platform portion 134 supports the snap-in jack 136 at an elevated position above the base plate 22 so the jack is easily accessible to a user during the wire connection procedure.

The connector support platform 134 provides a stable surface against which the snap-in jack 136 bears when, as an example, the punch down tool terminates the copper wires into the IDC connections on the snap-in jack. After the copper wire cable 14 is connected to the respective snap-in jack 136, the jack is removed from the connector support platform 134, and, as an example, the jack is installed in the center module 94 that is in the center module aperture 88 in the mounting frame 30. The copper wire cable 14 has a limited length such that, after the copper wire cable is attached to the snap-in jack 136 and the snap-in jack is snapped into the center module 94, there is substantially no excess copper wire cable stored within the housing 10.

The support rails 98 also provide a structure against which the electrical connector 20 can bear when the wire cable 14 is being terminated during the installation process. As an example, the copper wire cable 14 can be connected to the snap-in jack 136 when the snap-in jack is in a connection module 34 that is positioned in the module mounting frame 30. The copper wire cable 14 is pressed into the IDC connections on the snap-in jack 136, and the support rails 98 support the snap-in jack to prevent the jack and module from moving toward the base plate 22 and twisting within the module frame.

In the preferred embodiment, the base plate 22 and the components attached to the base plate, such as the left and right storage rings 24 and 26, the outer guide 28, the mounting frame 30, the cover alignment guide 114, the connector support platforms 134, and the connector support rails 98, are constructed of a substantially rigid, molded plastic, and all of these components are substantially integrally connected with the base plate to provide a unitary, molded plastic bottom portion of the housing 10 that removably receives the cover 36 thereon.

As best seen in FIG. 1, the cover 36 is retained on the base plate 22 by a cover latch tab 150 integrally attached to the cover alignment guide 114 extending along the right edge portion 42 of the base plate, and by a pair of cover retention tabs 152 integrally attached to the cover alignment guide extending along the left edge portion 44 of the base plate. The cover latch tab 150 and the cover retention tabs 152 project outwardly in opposite directions away from the cover alignment guide 114. The cover latch tab 150 and the cover retaining tabs 152 releasably engage the cover 36 so as to retain the cover in a covering position over the base plate with the left and right storage rings 24 and 26 being covered and the telecommunication components within the housing 10 being protected therebetween.

As best seen in FIG. 1, the cover 36 includes an upper plate portion 154 spaced apart from the base plate 22 when the cover is in the covering position, and an elongated cover sidewall 156 that extends substantially around the perimeter of the upper plate portion. The cover sidewall 156 has a frame receiving opening 158 that receives the module mounting frame 30 therein, such that the interior area 38 of the housing 10 is accessible when the cover 36 is in the covering position through the module mounting frame's left, center, and right module apertures 86, 88, and 90.

The cover sidewall 156 includes a left side portion 160 that extends adjacent to a portion of the base plate's front edge portion 32 away from the frame receiving opening 158 and the left side of the mounting frame 30 when the cover is in the covering position. The cover sidewall 156 extends about the front left corner of the cover 36 along a left side panel 162 and around the rear left corner of the cover.

Figure 5:
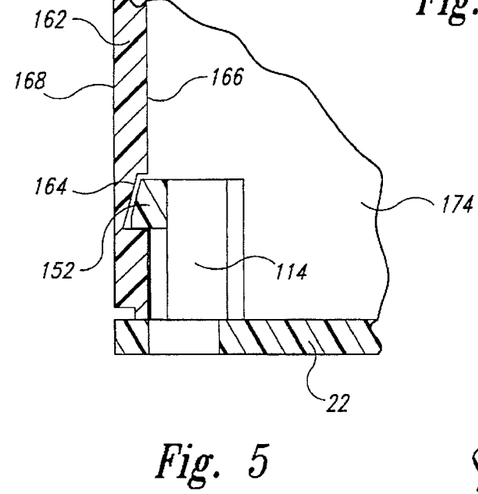
FIG. 5 is an enlarged cross-sectional view taken substantially along line 5—5 of FIG. 1 showing a cover retaining tab in a tab retaining recess in the cover.

As best seen in FIG. 5, the left side panel 162 has a pair of retaining tab recesses 164 therein positioned to removably receive the cover retaining tabs 152 on the cover alignment guide 114. The retaining tab recesses 164 extend only partially through the left side panel 162 from an interior surface 166 toward an exterior surface 168 such that the retaining tab recesses 164 are not visible from outside of the housing 10 when the cover is in the covering position. Each of the retaining tab recesses 164 receives one of the cover retaining tabs 142, and the cover retaining tabs are positioned to block the left side panel 162 of the cover 36 from moving upwardly away from the base plate, thereby retaining the left side of the cover in the covering position.

Figure 6:
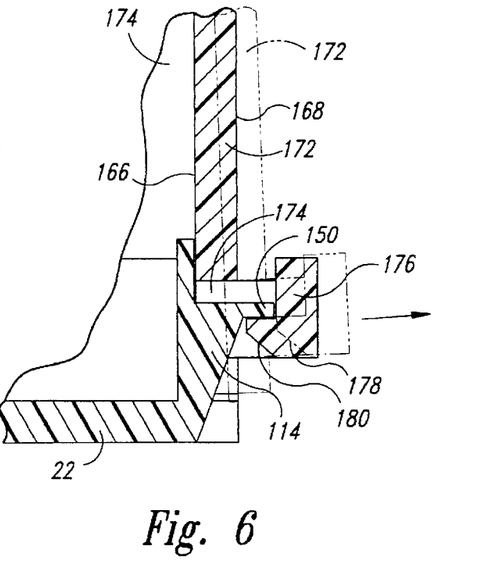
FIG. 6 is an enlarged cross-sectional view taken substantially along line 6—6 of FIG. 1, showing a side panel of the cover in solid lines in a latched position over a latch tab, and shown in phantom lines in a released position away from the latch tab.

As best seen in FIGS. 1 and 6, the cover sidewall 156 has a right side portion 170 generally opposite the left side portion 160 (FIG. 1). The right side portion 170 extends from the right side of the frame receiving opening 158 adjacent to a short length of the base plate's front edge portion 32, the front right corner of the cover 36 along a right side panel 172, and around a right rear corner of the cover. The right side portion 170 is connected to the left side portion 160 by a rear side panel 174 along the rear of the cover 36 and the frame receiving space extends between the left and right side portions along the front edge portion 32 of the cover.

The right side panel 172 has a latch tab aperture 174 that extends through the right side panel so as to be visible to a user when the cover 36 is in the covering position. The latch tab aperture 174 removably receives the cover latch tab 150 when the cover is in the covering position. The right side panel 172 has an exterior tab receiving shelf structure 176 that is visible to a user when the cover is in the covering position. The shelf structure 176 extends around the latch tab aperture 174 such that the cover latch tab 150 extends into the shelf structure. The shelf structure 176 includes bottom member 178 that extends under the cover latch tab 150 when the cover 36 is in the covering position to engage the cover latch tab and to prevent the right side portion 170 from moving upwardly away from the base plate 22.

The forward end of the right side portion 170 adjacent to the module mounting frame 30 is a free end that is sufficiently close to the front right corner of the cover 36 such that when the cover is in the covering position the right side panel 172 is movable relative to the base plate 22 and the cover latch tab 150. As best seen in FIG. 6, the right side panel 172 is movable between an inward, latched position, shown in solid lines, and an outward, released position, illustrated in phantom lines in FIG. 6. In the inward, latched position, the cover latch tab 150 extends through the latch tab aperture 174 in the right side panel 172 and into the shelf structure 176 of the cover. As the right side panel 172 is moved toward the outward released position, the shelf structure 176 is moved away from the cover latch tab 150 and the alignment guide 114 until the cover retaining tab is clear of the latch tab aperture 174 and the bottom member 178 of the shelf structure. Accordingly, the cover can be lifted upwardly away from the base plate 12 to expose the base plate and the left and right storage rings.

The cover 36 is moved from the open position toward the covering position by positioning the left side panel 162 adjacent to the base plate 22 so the cover retaining tabs 142 are positioned within the retaining tab recesses 164 in the left side panel. The right side panel 172 is then moved downwardly toward the base panel 22 and the cover latch tab 150 presses against a sloped bottom surface 180 of the bottom member 178 of the shelf structure 176 (FIG. 6) so as to cause the shelf structure and the right side panel 172 to deflect and move outwardly toward the outward, released position until the cover latch tab 150 is aligned with the latch tab aperture 174. The right side panel 172 then snaps into the inward, latched position with the cover latch tab 150 within the latch tab aperture 174 and within the shelf structure 176, thereby releasably latching the cover 36 over the base plate 22 in the covering position.

As best seen in FIG. 1, the cover 36 is lockable onto the base plate 22 by a fastener 182 that extends through a locking aperture 184 in the cover and screws into a coaxially aligned security screw boss 181 integrally connected to the base plate. Accordingly, the fastener 182 provides a second locking feature to retain the cover 36 in the covering position. The locking aperture 184 and the fastener 182 are covered by an information strip 186 that is removably connected to the upper plate portion plate 154. The information strip is, as an example, paper, plastic, or the like so as to display a selected message or design or the like along the top plate of the cover.

Figure 7:
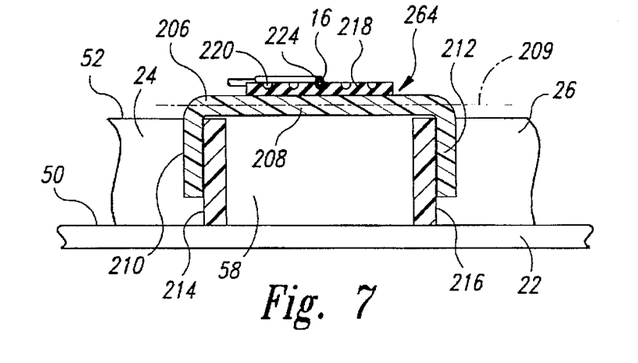
FIG. 7 is an enlarged cross-sectional view taken substantially along line 7—7 of FIG. 2 showing the splice tray platform.

As best seen in FIGS. 2 and 7, the housing 10 includes a splice tray platform 204 removably attached to the left and right storage rings 24 and 26, and the splice tray platform extends over the cross-over junction 58. The splice tray platform 204 has a support clip 206 having an inverted, generally U-shape cross-section. The support clip 206 has a web portion 208 that spans between the upper edges 52 of the left and right storage rings 24 and 26 and over the cross-over junction 58. The web portion has a longitudinal axis 209 extending across the cross-over section. Left and right retaining legs 210 and 212, respectively, are attached to the outer ends of the web portion 208. The left retaining leg 210 extends into the interior area of the left storage ring 24 and engages the inner wall surface 214 of the left storage ring. The right retaining leg 212 extends into the interior area of the right storage ring 26 and engages the inner wall surface 216 of the right storage ring. The left and right retaining legs 210 and 212 securely and positively hold the splice tray platform 206 on the left and right storage rings 24 and 26. The splice tray platform has a splice tray 218 attached to the web portion 208. The splice tray 218 has a plurality of fiber retention grooves 220 that are oriented at approximately a forty-five degree angle relative to the longitudinal axis 209 of the web portion 208. Accordingly, the fiber retention grooves 220 are generally aligned with optical fibers 16 extending between the left and right storage ring 24 and 26 through the cross-over junction 58.

The fiber retention grooves 220 in the splice tray 217 each have a substantially circular cross-sectional shape, and each of the grooves is sized to removably receive a splice sleeve 224 in a generally fixed position relative to the left and right storage rings 24 and 26. The splice sleeve 224 receives therein the ends of two optical fibers 16 in an end-to-end arrangement, and the splice sleeve is then fixed to the optical fibers to form a splice therebetween. Accordingly, the splice tray 218 of the splice pad platform 204 provides a platform to hold the optical fibers and the splice sleeve to facilitate a user in accurately splicing the two optical fibers 16.

In the preferred embodiment, the support clip 206 is a plastic unit that is easily and quickly snapped into position on the left and right storage rings 24 and 26, and is easily and quickly removed from the storage rings. In an alternate embodiment, not shown, the left and right legs 210 and 212 extend downwardly from the upper edge 52 of the left and right storage rings 24 and 26 and wrap partially under the bottom edge 48 of the respective storage ring to securely retain the splice tray platform 204 on the storage rings.

While various embodiments have been described in this application for illustrative purposes, the claims are not limited to the embodiments described herein. Equivalent devices may be substituted for those described, which operate according to the principles of the present invention and thus fall within the scope of the claims. Therefore, it is expressly to be understood that the modifications and variations and equivalents thereof made to the multi-media connection housing may be practiced while remaining within the spirit and the scope of the invention as defined by the following claims.

We claim:

1. A housing of the type for receiving optical fibers therein, the optical fibers being connectable to connectors, the connectors being terminated at adapters, the optical fibers having a minimum bend radius to avoid signal degeneration in the optical fibers, comprising:

a base having a side edge portion adapted to support the connectors and adapters therealong;

a first fiber-storage guide attached to the base and projecting away from the base, the first fiber-storage guide having a substantially cylindrical first outer guide surface with a radius that is greater than the minimum bend radius, the first outer guide surface being sized to receive the optical fibers therearound to prevent the optical fibers from bending with a bend radius that is smaller than the minimum bend radius;

a second fiber-storage guide attached to the base and projecting away from the base, the second fiber-storage guide having a substantially cylindrical second outer guide surface with a radius that is greater than the minimum bend radius, the second outer guide surface being sized to receive the optical fibers therearound to prevent the optical fibers from bending with a bend radius that is smaller than the minimum bend radius, the first and second fiber-storage guides being spaced apart from each other with a cross-over junction therebetween, the first and second fiber-storage guides being positioned to allow the optical fibers to selectively wrap around portions of the first and second outer guide surfaces, to pass through the cross-over junction, to extend between the first and second fiber-storage guides, and to terminate at the side edge portion without bending in a radius that is smaller than the minimum bend radius; and outer guides selectively spaced about the first and second fiber-storage guides and spaced away from the cross-over junction, the outer guides having spaces therebetween to receive the optical fibers so the optical fibers pass therethrough.

2. The housing of claim 1 wherein the base has an optical fiber access aperture therein exterior of the first and second fiber-storage guides, the optical fiber access aperture being sized to receive the optical fibers therethrough to allow the optical fibers to pass through the base.

3. The housing of claim 1 wherein the base has an optical fiber access aperture therein that communicates with the cross-over junction, the optical fiber access aperture being sized to receive the optical fibers therethrough to allow the optical fibers to pass through the base and into the cross-over junction.

4. The housing of claim 1 further including a plurality of retaining tabs attached to the first and second fiber-storage guides and projecting away from the first and second fiber-storage guides over the base.

5. The housing of claim 1 further including a connector support platform attached to the base within the first fiber-storage guide, the connector support platform being shaped to removably support a selected one of the connectors in a generally fixed position relative to the base and the first fiber-storage guide.

6. The housing of claim 5 wherein the first fiber-storage guide terminates in a top edge portion spaced away from the base, and the connector support platform has a platform portion adjacent to the top edge portion.

7. The housing of claim 6 wherein the platform portion is supported by sidewalls extending between the base and the platform portion.

8. The housing of claim 1 wherein the outer guides have curved portions, each curved portion having a radius of curvature that is greater than the minimum bend radius of the optical fibers.

9. The housing of claim 1 wherein the outer guides have curved portions, one of the curved portions being adjacent to the cross-over junction, the one curved portion having a radius of curvature that is greater than the minimum bend radius of the optical fibers.

10. The housing of claim 1 wherein the outer guides have two curved portions on opposite sides of the cross-over junction, the two curved portions extending toward the cross-over junction, each of the two curved portions having a radius of curvature that is greater than the minimum bend radius of the optical fibers.

11. The housing of claim 1 further including a cable access aperture within the first fiber-storage guide, the cable access aperture being sized to receive a wire cable therethrough.

12. The housing of claim 11 wherein the base has an optical fiber access aperture therein that communicates with the cross-over junctions, the optical fiber access aperture being sized to receive the optical fibers therethrough to allow the optical fibers to pass through the base and into the cross-over junction.

13. The housing of claim 1 wherein the optical fibers extend substantially tangentially toward the first and second fiber storage guides, the openings between the outer guides being positioned to receive the optical fibers therethrough as the optical fibers extend substantially tangentially toward one of the first and second fiber-storage guides without the optical fibers bending in a radius that is smaller than the minimum bend radius.

14. The housing of claim 1 further including a cover removably connected to the base to cover the base and the first and second fiber-storage guides.

15. A housing of the type for receiving portions of media cables including a fiber optic cable therein, the media cables being connectable to connectors, the fiber optic cable having optical fibers with a minimum bend radius to avoid signal degeneration in the optical fibers, comprising:

a base plate having a side edge portion adapted to support the connectors therealong;

a first fiber-storage ring attached to the base plate and projecting away from the base plate, the first fiber-storage ring having a substantially cylindrical first outer guide surface with a radius that is greater than the minimum bend radius, the first outer guide surface being sized to receive the optical fibers therearound to prevent the optical fibers from bending with a bend radius that is smaller than the minimum bend radius;

a second fiber-storage ring attached to the base plate adjacent to the first fiber-storage ring, the second fiber-storage ring projecting away from the base plate, the second fiber-storage ring having a substantially cylindrical second outer guide surface with a radius that is greater than the minimum bend radius, the second outer guide surface being sized to receive the optical fibers therearound to prevent the optical fibers from bending with a bend radius that is smaller than the minimum bend radius, the first and second fiber-storage rings being positioned to allow the optical fibers to selectively wrap around portions of the first and second inner guide surfaces, the first and second fiber-storage guides being spaced apart from each other with a cross-over junction therebetween, the first and second fiber-storage guides being positioned to allow the optical fibers to selectively wrap around portions of the first and second inner guide surfaces, to pass through the cross-over junction, to extend between the first and second fiber-storage guides, and to terminate at the side edge portion without bending in a radius that is smaller than the minimum bend radius;

a guidewall attached to the base plate and projecting away from the base plate, the guidewall having portions facing the first and second fiber-storage rings and having portions adjacent to the cross-over junction, the guidewall being spaced apart from the first and second fiber-storage rings, the guidewall and the first and second guide surfaces defining a optical fiber path therebetween extending around the first and second fiber-storage rings and between the first and second fiber-storage rings through the cross-over junction, the optical fiber path being shaped to allow the optical fibers to selectively wrap around each of the first and second fiber-storage rings and to extend through the cross-over junction, the outer guidewall having optical fiber path openings therein sized to receive the optical fibers so the optical fibers exit the optical fiber path and extend toward the side edge portion of the base; and a cover removably connected to the base plate to cover the base plate and the first and second fiber-storage rings.

16. The housing of claim 15 wherein the guidewall is a substantially continuous guidewall with elongated wall portions, the optical fiber path openings being between adjacent wall portions.

17. The housing of claim 15 wherein the base has a connector receiving portion connected to the side edge portion.

18. The housing of claim 15 wherein the base plate has an access aperture therein communicating with the optical fiber path, the access aperture being sized to receive the optical fibers therethrough, allowing the optical fibers to pass through the base plate and into the optical fiber path.

19. The housing of claim 15 wherein the base plate has an access aperture therein that communicates with the cross-over junction, the access aperture being sized to receive the optical fibers therethrough to allow the optical fibers to pass through the base plate and into the cross-over junction.

20. The housing of claim 15 further including a plurality of retaining tabs attached to the first and second fiber-storage rings and projecting toward the guidewall, each of the retaining tabs projecting over a portion of the optical fiber path, the retaining tabs being positioned to retain the optical fibers within the optical fiber path.

21. The housing of claim 15 further including a plurality of retaining tabs attached to the guidewall and projecting toward one of the first and second fiber-storage rings, each of the retaining tabs projecting over the optical fiber path, the retaining tabs being positioned to retain the optical fibers within the optical fiber path.

22. The housing of claim 15 wherein the guidewall has curved portions each having a radius of curvature that is greater than the minimum bend radius of the fiber optic cable.

23. The housing of claim 15 further including a cable access aperture within the first fiber-storage guide and sized to receive a wire cable therethrough.

24. The housing of claim 23 wherein the base has an optical fiber access aperture therein that communicates with the cross-over junction, the optical fiber access aperture being sized to receive the optical fibers therethrough to allow the optical fibers to pass through the base and into the cross-over junction.

25. A housing of the type for receiving media cables therein, each of the media cables being connectable to a connector, comprising:

a base having a top surface and first and second side portions;

first and second cable-storage guides attached to the top surface of the base and projecting away from the top surface, the first and second cable-storage guides being sized to store a portion of the media cables therearound;

a first cover alignment guide attached to the first side portion of the base and projecting away from the top surface of the base, the first cover alignment guide having a cover latching tab projecting therefrom;

a second cover alignment guide attached to the second side portion of the base and projecting away from the top surface of the base, the second cover alignment guide having a cover retaining tab protruding therefrom; and a cover removably attached to the first and second cover alignment guides to cover the base, the cover having a top panel and an outer wall panel projecting from the top panel toward the base to support the top panel away from the base with the first and second storage guides therebetween, the outer wall panel having a latch aperture extending therethrough that removably receives the latching tab therein and having a tab recess extending only partially through the outer wall panel, the tab recess removably receiving the latch retaining tab therein, the outer wall portion having first and second end portions and the outer wall portion extending partially around the top panel and terminating at the first and second end portions, the first and second end portions being spaced apart from each other to define connector receiving area therebetween to receive the connector, the first end portion being substantially adjacent to the first cover alignment guide and being a free end portion that is movable relative to the first cover alignment guide to move the outer wall portion adjacent to the latch aperture between a latched position with the latching tab within the latch aperture and a released position with the latch tab being out of the latch aperture to allow the cover to be removed from the base.

26. A multi-media cable housing of the type for receiving portions of media cables, each of the media cables being connectable to a cable connector module, comprising:

a generally planar base plate having an interior portion, a first side portion, a second side portion opposite the first side portion, and opposing third and fourth side portions extending between the first and second side portions, the first, second, third, and fourth side portions being interconnected and extending around the interior portion;

a module frame attached to the third side portion of the base plate and projecting away from the base plate, the module frame having a plurality of openings therein sized to removably receive the cable connector module therein;

first and second cable-storage rings attached to an interior portion of the base plate and projecting away from the base plate, the first and second cable-storage rings being spaced apart from each other to define a cable cross-over junction therebetween, the first and second cable-storage rings being sized to store a portion of the media cable therearound, and the cable cross-over junction being sized to allow the media cable to pass therethrough and extend between the first and second cable-storage rings;

a first cover alignment guide attached to the first side portion of the base plate and projecting away from the base panel, the first cover alignment guide having a cover latching tab projecting therefrom;

a second cover alignment guide attached to the second portion of the base plate, the second cover alignment guide having a cover retaining nub protruding therefrom; and a cover removably attached to the base plate, the cover having a generally planar top panel spaced apart from the base plate, a first wall panel projecting from the top panel toward the first side portion of the base plate, a second wall panel projecting from the top panel toward the second side portion of the base plate, and a third wall panel projecting from the top panel toward the third side portion of the base plate, the third wall panel having an elongated receiving area therein that extends substantially adjacent to the first wall portion toward the second wall portion, the elongated receiving area being shaped and sized to receive a portion of the mounting frame therein, the first wall panel being movable relative to the first cover alignment guide between a latched position and a released position, the first wall panel having a latch receiving member thereon with a latch aperture extending therethrough, the latch receiving member removably retaining the latching tab in the latch aperture when the first wall portion is in the latched position, and the latch tab being away from the latch receiving member and out of the latch recess when the first wall portion is in the released position, the second wall portion having an inside surface facing toward the second cover alignment guide and an outside surface facing away from the second alignment guide, the second wall portion having a nub recess therein extending partially through the second wall portion from the inside surface toward the outside surface, the nub recess terminating inwardly of the outside surface, the nub recess removably receiving the retaining nub to hold the second wall portion adjacent to the second cover alignment guide as the first wall portion is moved between the latched and unlatched positions.

* * * * *